United States Patent
Lan et al.

(10) Patent No.: US 11,133,995 B2
(45) Date of Patent: Sep. 28, 2021

(54) DETECTION METHOD, DEVICE, AND SYSTEM

(71) Applicant: HUAWEI TECHNOLOGIES CO., LTD., Guangdong (CN)

(72) Inventors: Haiqing Lan, Shenzhen (CN); Dongyu Chu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 189 days.

(21) Appl. No.: 16/387,981

(22) Filed: Apr. 18, 2019

(65) Prior Publication Data

US 2019/0245762 A1     Aug. 8, 2019

Related U.S. Application Data

(63) Continuation of application No. PCT/CN2016/102602, filed on Oct. 19, 2016.

(51) Int. Cl.
| | |
|---|---|
| *H04L 12/26* | (2006.01) |
| *H04L 12/801* | (2013.01) |
| *H04L 25/02* | (2006.01) |
| *H04W 24/08* | (2009.01) |

(52) U.S. Cl.
CPC ........ *H04L 43/067* (2013.01); *H04L 25/0262* (2013.01); *H04L 43/0894* (2013.01); *H04L 47/10* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 7,085,227 B1* | 8/2006 | Brooks | ........... H04L 43/50 370/229 |
| 9,032,070 B1 | 5/2015 | Stickle et al. | |
| 2002/0194361 A1 | 12/2002 | Itoh et al. | |

(Continued)

FOREIGN PATENT DOCUMENTS

| | | |
|---|---|---|
| CN | 101247291 A | 8/2008 |
| CN | 102843275 A | 12/2012 |

(Continued)

OTHER PUBLICATIONS

International Search Report dated Jun. 28, 2017 in corresponding International Application No. PCT/CN2016/102602.

*Primary Examiner* — Shripal K Khajuria
(74) *Attorney, Agent, or Firm* — Leydig, Voit & Mayer, Ltd.

(57) ABSTRACT

The present invention provides a detection method used for transmission bandwidth detection in multi-level transmission bandwidth assurance, including: detecting, by at least two transmission bandwidth detection units, a transmission bandwidth of a transmission link; where each transmission bandwidth assurance level in the multi-level transmission bandwidth assurance is corresponding to only one of the at least two transmission bandwidth detection units, and when the transmission link operates at a first transmission bandwidth assurance level, a first transmission bandwidth detection unit corresponding to the first transmission bandwidth assurance level detects the transmission bandwidth of the transmission link.

16 Claims, 4 Drawing Sheets

(56) References Cited

U.S. PATENT DOCUMENTS

| | | | | |
|---|---|---|---|---|
| 2006/0244973 A1* | 11/2006 | Yun | .................... | G01B 9/02091 |
| | | | | 356/511 |
| 2010/0103820 A1* | 4/2010 | Fuller | .................... | H04W 48/06 |
| | | | | 370/236 |
| 2010/0142376 A1* | 6/2010 | Lou | .................... | H04L 47/283 |
| | | | | 370/236 |
| 2011/0044383 A1* | 2/2011 | Maruyama | .......... | H04L 25/0204 |
| | | | | 375/232 |
| 2011/0219142 A1 | 9/2011 | Lin et al. | | |
| 2017/0055133 A1* | 2/2017 | Dieselberg | .............. | H04W 4/08 |
| 2017/0324619 A1* | 11/2017 | Zhu | .................... | H04L 43/0894 |

FOREIGN PATENT DOCUMENTS

| | | |
|---|---|---|
| CN | 103023799 A | 4/2013 |
| CN | 103259696 A | 8/2013 |
| CN | 105978754 A | 9/2016 |
| EP | 1235392 A1 | 8/2002 |
| EP | 2273737 A1 | 1/2011 |
| WO | 0225878 A1 | 3/2002 |

\* cited by examiner

DETECTION METHOD, DEVICE, AND SYSTEM

CROSS-REFERENCE TO RELATED APPLICATIONS

This application is a continuation of International Application No. PCT/CN2016/102602, filed on Oct. 19, 2016, the disclosure of which is hereby incorporated by reference in its entirety.

TECHNICAL FIELD

The present invention relates to communications technologies, and in particular, to a transmission bandwidth detection method, a device, and a system.

BACKGROUND

A transmission bandwidth represents a data transmission capability and is an important resource in a communications system. Service traffic scheduling based on the transmission bandwidth helps achieve communication objectives of a high transmission rate, a low transmission delay, and a low packet loss rate. Therefore, how to obtain an actual transmission bandwidth of a transmission link has been pursued in the industry.

However, real-time performance and accuracy of a currently used transmission bandwidth detection technology are not ideal, and problems such as service interruption and increased network load still exist.

SUMMARY

The present invention provides a detection method, a device, and a system, applicable to a current transmission network, so as to effectively improve transmission bandwidth detection quality.

According to a first aspect, an embodiment of this application provides a detection method used for transmission bandwidth detection in multi-level transmission bandwidth assurance, including: detecting, by at least two transmission bandwidth detection units, a transmission bandwidth of a transmission link; where each transmission bandwidth assurance level in the multi-level transmission bandwidth assurance is corresponding to only one of the at least two transmission bandwidth detection units, and when the transmission link operates at a first transmission bandwidth assurance level, a first transmission bandwidth detection unit corresponding to the first transmission bandwidth assurance level detects the transmission bandwidth of the transmission link; and the first transmission bandwidth assurance level is a transmission bandwidth assurance level in the multi-level transmission bandwidth assurance, and the first transmission bandwidth detection unit belongs to the at least two transmission bandwidth detection units.

Further, an operating time of the transmission link may be divided based on a transmission bandwidth assurance level, and transmission bandwidth detection units that detect the transmission bandwidth of the transmission link in two neighboring operating time subsegments are different.

Based on the foregoing aspect, this application further provides the following possible designs:

In a possible design, a controlling unit triggers, when the transmission link operates at the first transmission bandwidth assurance level, the first transmission bandwidth detection unit corresponding to the first transmission bandwidth assurance level to detect the transmission bandwidth of the transmission link. That is, the control unit controls detection work of the at least two transmission bandwidth detection units.

Optionally, the control unit determines, based on at least one of a transmission bandwidth status in a current time segment and a transmission congested state in the current time segment, that the transmission link is at the first transmission bandwidth assurance level in the current time segment.

That the control unit triggers, when the transmission link operates at the first transmission bandwidth assurance level, the first transmission bandwidth detection unit corresponding to the first transmission bandwidth assurance level to detect the transmission bandwidth of the transmission link may specifically include:

determining, by the control unit based on the determined first transmission bandwidth assurance level, a transmission bandwidth detection unit corresponding to the first transmission bandwidth assurance level as the first transmission bandwidth detection unit; and triggering, by the control unit, the first transmission bandwidth detection unit to operate in the current time segment.

Optionally, a detection result of the first transmission bandwidth detection unit corresponding to the first transmission bandwidth assurance level in the current time segment is a transmission bandwidth status in a next time segment.

In a possible design, a combination unit adds detection results of the at least two transmission bandwidth detection units in time domain, to obtain a time-domain combined transmission bandwidth. In this way, transmission bandwidth changes can be fully understood in an entire time domain range.

Optionally, the combination unit can further output numbers of transmission bandwidth assurance levels of the transmission link in different operating time segments.

In a possible design, in a case of detection startup, detected-fault rectification, or particular triggering, a self-starting self-recovery unit creates congestion to obtain a transmission bandwidth parameter of at least one transmission bandwidth assurance level in the multi-level transmission bandwidth assurance, where the transmission bandwidth parameter is used by a transmission bandwidth detection unit corresponding to the at least one transmission bandwidth assurance level to perform in-detection transmission bandwidth tracking on the transmission bandwidth of the transmission link; where duration of the congestion includes a plurality of measurement periods, and a ratio of a congestion detection rate of a current measurement period to a congestion detection rate of a previous measurement period is a ratio of a measurement data packet pass rate of a current period to a target data packet pass rate of the current period. This accelerates detection of the detection unit, and implements fast locking and tracking until an accurate transmission bandwidth is obtained.

In a possible design, the detection includes a plurality of measurement periods, and the at least two transmission bandwidth detection units calculate the transmission bandwidth of the transmission link by using $H*(H-1)/2$ sample points obtained in each measurement period. The $H*(H-1)/2$ sample points obtained in each measurement period is obtained through sampling after H measurement data packets sent in each measurement period are combined in a unit of any two measurement data packets. H is a positive integer greater than or equal to 3. This can greatly improve accuracy of receive time interval measurement.

In a possible design, the transmission bandwidth detection unit, the control unit, the combination unit, and the self-starling self-recovery unit exist, the units may be located in a same transmission device, or deployed dispersedly in a transmission network to which the transmission link belongs. When these units are located in a same transmission device, detection efficiency is higher and implementation is easy; when these units are deployed dispersedly in the transmission network, flexibility is higher and implementation is not limited by a site.

According to a second aspect an embodiment of the present invention provides a transmission device, and the transmission device has a function of implementing the foregoing method designs. The function may be implemented by hardware, or may be implemented by hardware executing corresponding software. The hardware or software includes one or more units that correspond to the foregoing function. The transmission device may be a source device, namely a data sender, or may be a destination device, namely a data receiver. Specifically, the transmission device may be a terminal, an access network device, a core network device, and the like.

In a possible design, a structure of the transmission device includes a processor and a communications interface. The processor is configured to support the transmission device in implementing corresponding functions in the foregoing method. The communications interface is configured to support communication between the transmission device and another transmission device. The transmission device may further include a memory. The memory is configured to be coupled with the processor and stores a program instruction and data necessary for the transmission device.

According to a third aspect, an embodiment of the present invention provides a detection system, including the at least two transmission bandwidth detection units in the first aspect.

In a possible design, the detection system further includes the control unit in the first aspect.

In a possible design, the detection system further includes the combination unit in the first aspect.

In a possible design, the detection system further includes the self-starting self-recovery unit in the first aspect.

All the transmission bandwidth detection units, the control unit, the combination unit, and the self-starting self-recovery unit in the foregoing designs are capable of implementing corresponding method functions in the first aspect.

According to a further aspect, an embodiment of the present invention provides a computer storage medium, configured to store a program designed to perform the foregoing aspects.

According to a further aspect, an embodiment of the present invention provides a chip system, including: at least one processor, a memory, an input-output part, and a bus, where the at least one processor obtains an instruction from the memory through the bus, to implement functions in the foregoing method.

In the technical solutions of the embodiments of the present invention, the at least two transmission bandwidth detection units are used to detect the transmission bandwidth of the transmission link. In particular, in the multi-level transmission bandwidth assurance mechanism, at each level, a transmission bandwidth detection unit corresponding to the level is used to detect the transmission bandwidth of the transmission link. This greatly reduces detection duration, and improves real-time performance of detection and accuracy of each detection.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The technical solutions of the embodiments of the present invention may be applied to various transmission networks, including but not limited to a wired network, a wireless network, a time division multiplexing (TDM) network, a packet transport network, and the like. In this application, terms "network" and "system" are usually used alternately, but a person skilled in the art can understand their meanings.

The technical solutions of the embodiments of the present invention may be applied to transmission protocols at various layers, including but not limited to a network layer and a media access control layer.

The technical solutions of the embodiments of the present invention may be applied between a source node and a destination node. The source node, namely a data sender, is one end of a transmission link, and the destination node, namely a data receiver, is the other end of the transmission link. A node may be a module or a transmission device. When the node is a module, the source node and the destination node are also referred to as a source module and a destination module, and may be located in a same transmission device. When the node is a transmission device, in a communications system, the source node and the destination node are also referred to as a source device and a destination device, and may be actually an access network device, a terminal, a core network device, or the like. The access network device may be a base station, and the base station may include various forms of a macro base station, a micro base station, a relay station, an access point, and the like. A device having a base station function may have different names in systems using different radio access technologies. For example, the device is referred to as an evolved NodeB (eNodeB) in a Long Term Evolution (LTE) network, the device is referred to as a Node B in a 3rd generation network, and so on. A terminal may include a handheld device, an in-vehicle device, a wearable device, or a computing device that provides a radio communication function, another processing device connected to a wireless modem, and various forms of a mobile station (MS), user equipment (UE), and the like. The core network device, for example, in the LTE network, is referred to as a mobility management entity (MME).

Figure 1:
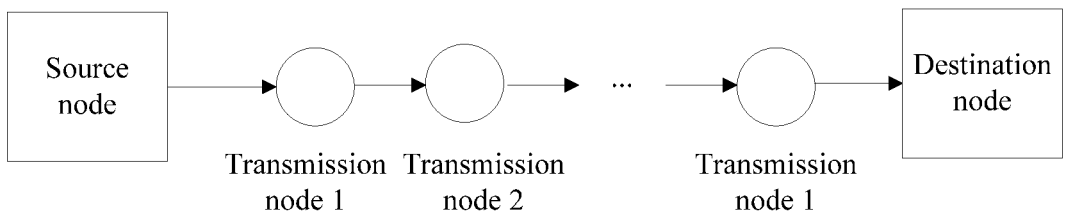
FIG. 1 is a diagram of an application scenario according to an embodiment of the present invention.

FIG. 1 is a diagram of an application scenario according to a technical solution of an embodiment of the present invention. FIG. 1 shows an end-to-end transmission scenario. One end of a transmission link is a source node, and the other end is a destination node. Further, there may be N transmission nodes on the transmission link. Two neighboring nodes may form a transmission segment. The following explains some terms and concepts in this embodiment of the present invention. An available bandwidth is a transmission bandwidth corresponding to a transmission rate of a largest service transmitted with quality assurance from the source node to the destination node. A bottleneck bandwidth is a physical pipe bandwidth or a logical pipe bandwidth of a node corresponding to a minimum available bandwidth in each segment. For example, a user A and a user B share one pipe bandwidth, and the pipe bandwidth is C. A current service rate of the user A is B1, and an available bandwidth of the user B is C−B1. In addition, this embodiment of the present invention further relates to a committed bandwidth and a burst bandwidth. The commuted bandwidth is a assured achievable bandwidth in transmission, and the burst bandwidth is a maximum achievable transmission bandwidth in transmission. Duration of the burst bandwidth cannot be assured, and is therefore relatively short usually. Correspondingly, with reference to the definitions of the bottleneck bandwidth and the available bandwidth, definitions of a committed available bandwidth, a committed bottleneck bandwidth, a burst available bandwidth, a burst bottleneck bandwidth, and the like may be obtained.

At present, a multi-level transmission bandwidth assurance technology is widely used. The multi-level bandwidth assurance technology can be expressed by using multi-token-bucket rate limit. Each transmission bandwidth assurance level is corresponding to a value of a bandwidth, such as a bottleneck bandwidth and an available bandwidth, supported by a transmission link at the level. A to-be-used transmission bandwidth assurance level may be determined based on a condition such as a transmission congestion status, and then for the transmission link in network transmission, values of various bandwidths corresponding to the level are used as standards for transmission.

A transmission bandwidth is usually detected by using a packet injection measurement method. For example, a source node gradually increases a transmit rate of a detection packet until packet loss occurs on a target node. The transmit rate at this moment is a burst available bandwidth. The source node gradually decreases the transmit rate of the detection packet until there is no packet loss at the target node. The transmit rate at this moment is a committed available bandwidth. In transmission bandwidth detection in the prior art, bandwidth detection units in use are not distinguished.

However, for a transmission network that uses the multi-level transmission bandwidth assurance technology the foregoing detection manner features a long detection time and poor real-time performance because real-time bandwidth changes cannot be tracked. In addition, the manner features low accuracy, and also increases network load, leading to service interruption.

Figure 2:
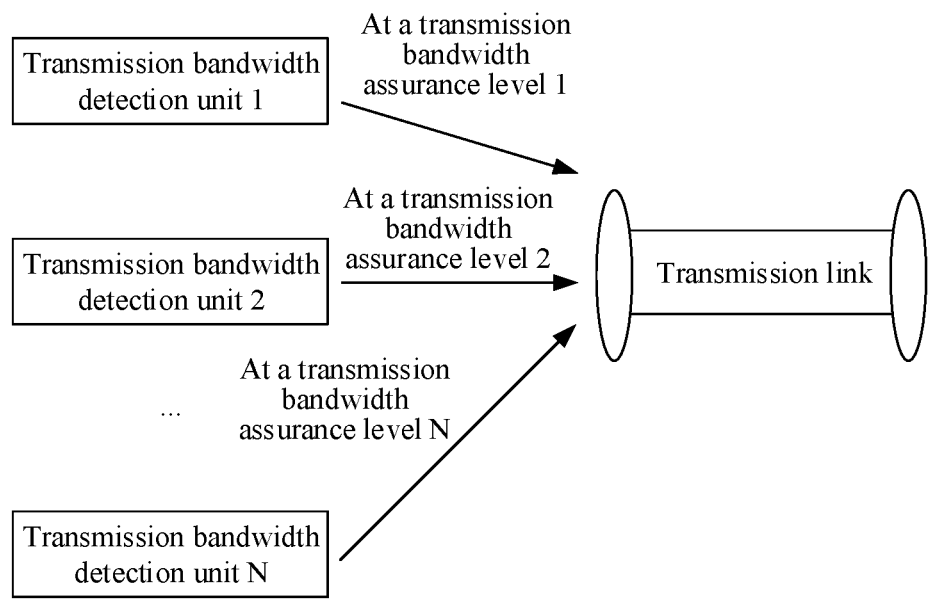
FIG. 2 is an application architecture according to an embodiment of the present invention.

Based on the foregoing problems, an embodiment of the present invention provides a detection mechanism, as shown in FIG. 2. During transmission bandwidth detection for a transmission link, at least two bandwidth detection units are introduced. When the transmission link is at a different transmission bandwidth assurance level, a different bandwidth detection unit detects the transmission link.

Figure 3:
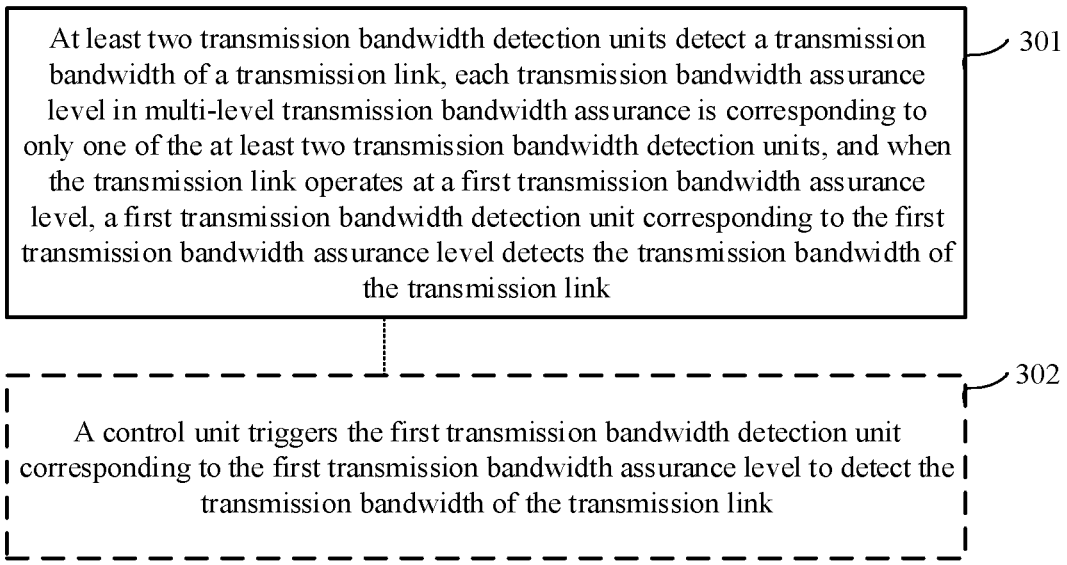
FIG. 3 is a schematic flowchart of a detection method according to an embodiment of the present invention.
Figure 4:
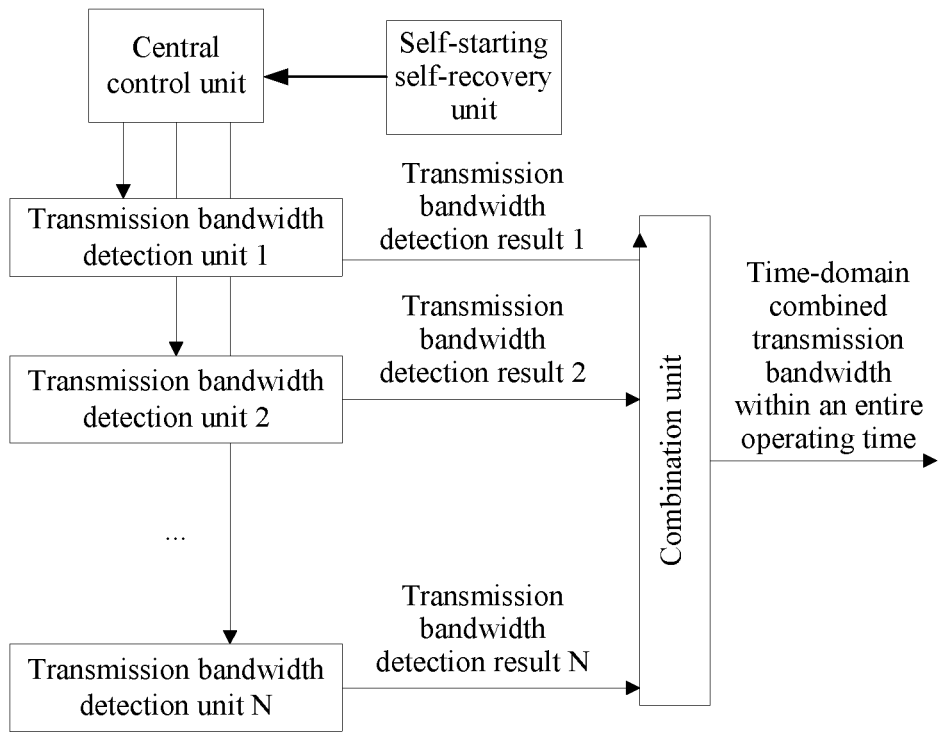
FIG. 4 is a flowchart of self-starting self-recovery according to an embodiment of the present invention.

FIG. 3 is a schematic flowchart of a detection method according to an embodiment of the present invention. The method may be applied in the application scenario shown in FIG. 1, and can be implemented in an architecture corresponding to FIG. 2. The method includes the following steps.

301: At least two transmission bandwidth detection units detect a transmission bandwidth of a transmission link.

Each transmission bandwidth assurance level in multi-level transmission bandwidth assurance is corresponding to only one of the at least two transmission bandwidth detection units, and when the transmission link operates at a first transmission bandwidth assurance level, a first transmission bandwidth defection unit corresponding to the first transmission bandwidth assurance level detects the transmission bandwidth of the transmission link. The first transmission bandwidth assurance level is a transmission bandwidth assurance level in the multi-level transmission bandwidth assurance, and the first transmission bandwidth detection unit belongs to the at least two transmission bandwidth detection units.

This embodiment of the present invention is mainly applied to a transmission network that uses a multi-level transmission bandwidth assurance technology.

In an example, a quantity of transmission bandwidth detection units is configured based on a transmission bandwidth assurance level. The quaintly of transmission bandwidth detection units is configured based on a quantity of transmission bandwidth assurance levels. The quantity of transmission bandwidth assurance levels is equal to the quantity of transmission bandwidth detection units. If there is one physical bandwidth level by default, and one transmission bandwidth detection unit may be configured for this level. The following uses two-level transmission bandwidth assurance as an example. Level-1 transmission bandwidth assurance may be corresponding to an uncongested state of the transmission link, level-2 transmission bandwidth assurance may be corresponding to a congested state of the transmission link, and transmission bandwidth detection units are configured respectively for the two levels. In other words, in a normal operating state, assuming that the multi-level transmission bandwidth assurance includes a first transmission bandwidth assurance level, detection on a transmission link at the first transmission bandwidth assurance level is performed only by one transmission bandwidth detection unit, and the one transmission bandwidth detection unit is set as a first transmission bandwidth detection unit. The first transmission bandwidth detection unit can always detectly for the first transmission bandwidth assurance level. To be specific, the first transmission bandwidth detection unit and the first transmission bandwidth assurance level are in a one-to-one correspondence. In addition, each transmission bandwidth assurance level on the transmission link is in such a relationship with a transmission bandwidth detection unit. Certainly, depending on an actual status, a transmission bandwidth assurance level may be any integer greater than, or equal to 2, and this is not limited herein. In an implementation, the quantity of transmission bandwidth assurance levels is equal to the quantity of transmission bandwidth detection units. Alternatively, if the transmission bandwidth detection unit may have two states, namely configured and unconfigured, the quantity of transmission bandwidth assurance levels is equal to a quantity of configured transmission bandwidth detection units, and an unconfigured transmission bandwidth detection unit is deleted, or an unconfigured transmission bandwidth detection unit is set to be in an idle state. It should be noted that the term "first" described above is not specific, but is only a broad reference. For example, all transmission bandwidth detection units meeting the foregoing requirement may be referred to as a "first transmission bandwidth detection unit".

Transmission bandwidth detection units are independent of each other. To be specific, a transmission bandwidth detection unit does not use an intermediate state or an output result of another detection unit as an input condition of the transmission bandwidth detection unit. Each transmission bandwidth, detection unit can output a bandwidth at a transmission bandwidth assurance level corresponding to the transmission bandwidth detection unit, such as a bottleneck bandwidth and an available bandwidth. In addition, each transmission bandwidth detection unit can output an operating status of a current transmission link, for example, a committed bandwidth operating status or a burst bandwidth operating status.

A transmission status of a transmission link changes in real time, thereby causing real-time changing of a transmission bandwidth assurance level of the transmission link. Therefore, an operating time of the transmission link can be segmented based on the transmission bandwidth assurance level. That is, when the transmission bandwidth assurance level of the transmission link changes, the operating time of the transmission link is segmented, so that a different transmission bandwidth assurance level is corresponding to one operating time subsegment. It can be learned from the foregoing description that transmission bandwidth detection units that detect the transmission bandwidth of the transmission link in two adjacent operating time subsegments are different. In an implementation, the transmission bandwidth detection units corresponding to various transmission bandwidth assurance levels need to be controlled to operate in different operating time subsegments of the operating time. In other words, these transmission bandwidth detection units are controlled to detect the transmission link separately in different operating time subsegments of the operating time. Therefore, when the transmission link operates at the first transmission bandwidth assurance level, the method may further include the following steps.

302: A control unit triggers the first transmission bandwidth detection unit corresponding to the first transmission bandwidth assurance level to detect the transmission bandwidth of the transmission link.

A sequence between 301 and 302 is not limited. From a perspective of logic, the transmission bandwidth detection unit may be triggered by the control unit to complete the method procedure of this embodiment of the present invention. Specifically, in time domain, if the transmission link is at a transmission bandwidth assurance level, the control unit triggers a transmission bandwidth detection unit corresponding to the transmission bandwidth assurance level to operate and detect a bandwidth of the transmission link such as a bottleneck bandwidth or an available bandwidth. This function can be implemented by a central control unit in FIG. 2.

In an example, the control unit can determine, based on a status of the transmission, link in a current time segment, that the transmission link is at the first transmission bandwidth assurance level in the current time segment. The status of the transmission link includes at least one of a transmission bandwidth status in the current time segment and a transmission congested state in the current time segment.

The current transmission bandwidth status may include a transmission bandwidth at a current transmission bandwidth assurance level of the transmission link, a current operating status of the transmission link, and the like. In other words, the control unit determines the transmission bandwidth assurance level in the current time segment based on the status of the transmission link, and then triggers the transmission bandwidth detection unit corresponding to this transmission bandwidth assurance level to operate.

In an example, an output result obtained after the first transmission bandwidth detection unit operating in the current time segment detects the bandwidth of the transmission link may be used by the control unit as a transmission bandwidth status for a next time segment. In other words, an output of the first transmission bandwidth detection unit may be used as a reference condition for step 302.

For example, the aforementioned two-level transmission bandwidth assurance is respectively corresponding to an uncongested state or a congested state. 302 may be specifically implemented by the control unit by performing the following steps.

302a: Determine a transmission bandwidth assurance level.

A current transmission bandwidth assurance level of the transmission link is determined. Specifically, whether the transmission link is currently in the congested state may be determined. There may be many determining methods, and this is not limited herein. For example, a packet loss rate is used as a basis for determining. When the packet loss rate is greater than a value, the transmission link is determined to be in the congested state; otherwise, the transmission link is determined to be in the uncongested state. Alternatively, latency is used as a basis for determining. When the latency is greater than a long-term average value by a value, the transmission link is determined to be in the congested state; otherwise, the transmission link is determined to be in the uncongested state. Further alternatively, both a packet loss rate and latency are used as a basis for determining, that is, a combination of the foregoing two solutions. The transmission link is determined to be in the congested state provided that the packet loss rate is greater than a value or the latency is greater than a long-term average value by a value; otherwise, the transmission link is determined to be in the uncongested state.

Subsequently, a determining result may be further corrected. For example, if a sum of a current available bandwidth and a transmit rate of the transmission link is less than or equal to a current bottleneck bandwidth, the current link is considered to be in the uncongested state. In other cases, an original determining result is retained.

If the determining result is an uncongested state, the transmission link is determined to be currently in level-1 bandwidth assurance; if the determining result is a congested state, the transmission link is determined to be currently in level-2 bandwidth assurance.

302b: Map a transmission bandwidth detection unit.

A mapping process needs to satisfy that one transmission bandwidth assurance level is corresponding to one transmission bandwidth detection unit. That is, one transmission bandwidth detection unit can serve only one transmission bandwidth assurance level. The transmission bandwidth detection unit is allowed to be in an unconfigured state, or in an idle state. In this case, when a configured bandwidth detection unit cannot work normally due to a fault, or another status an unconfigured or idle transmission bandwidth detection unit can replace the configured bandwidth detection unit in a timely manner. Alternatively, when the transmission network uses more-level transmission bandwidth assurance based on a real-time status of the transmission link, the unconfigured or idle transmission bandwidth detection unit can be corresponding to new-level transmission bandwidth assurance in a timely manner and update to the configured state, thereby not affecting implementation of the entire solution.

For example, this step is implemented in the following manners:

numbering a transmission bandwidth detection unit; inputting a sequence number corresponding to a transmission bandwidth assurance level; allocating a bandwidth detection unit having a same number as a current transmission bandwidth assurance level; and outputting a mapping table of a transmission bandwidth assurance level and a bandwidth detection unit.

It should be noted that an implementation time of 302b is not necessarily after that of 302a, and may be before that of 302a, because 302b is a preset step.

302c: Trigger the transmission bandwidth detection unit to operate.

A transmission bandwidth detection unit that needs to operate currently may be obtained based on the determining result in 302a and with reference to a mapping relationship obtained through mapping in 302b. Based on this, the transmission bandwidth detection unit is triggered to detect the transmission bandwidth of the transmission link.

In an example, transmission bandwidth detection results of these transmission bandwidth detection units within the operating time may be added in time domain, to obtain a time-domain combined transmission bandwidth within the operating time. This feature may be implemented by a combination unit. Optionally, the combination unit can further output numbers of transmission bandwidth assurance levels of the transmission link in different operating time segments.

Detection manners of various transmission bandwidth detection units are not limited in this embodiment of the present invention, and a detection manner of each transmission bandwidth detection unit is not required to be the same. In an example, at least one transmission bandwidth detection unit may detect the transmission bandwidth in the following manner:

A source node may periodically send a detection sequence, and a transmit rate of the detection sequence is u(M), where M is a number of a measurement period and M is a positive integer greater than or equal to 1. The detection sequence is sent continuously and has short duration.

A value of u(M) may be any value between an available bandwidth of a previous period, namely a (M−1) period, and a maximum value of u(M), and is able to cause transient congestion. Both the available bandwidth of the (M−1) period and the maximum value of u(M) are parameters of the transmission detection unit, and the transmission detection unit is independent of another transmission detection unit. In other words, a detection result of another transmission detection unit is not referenced.

In one period, for example, the period M, the detection sequence may include a set of measurement data packets. Lengths of measurement data packets that are sent are the same, and are all L, where L≥0. Then a transmit time interval GAP between two adjacent measurement data packets that are sent is L/u(M). Further, if two measurement data packets that are sent are P(I) and P(J), where I and J are numbers of the measurement data packets, a transmit time interval between the two measurement data packets is GAP*(J−I).

On a destination node, for the two measurement data packets, namely P(I) and P(J), that are sent by the source node, it can be assumed that a receive time interval between the two measurement data packets is $GAP_{R(I,J)}$. The receive time interval is normalized as $GAP_{R(I,J)}/(J-I)$, that is, a sample point of the receive time interval is the measurement period M. In other words, if a quantity of measurement data packets of the detection sequence is H, according to a data combination principle, a sample point is collected in a unit of any two of the H measurement data packets, and $C_H^2 = H*(H-1)/2$ sample points can be obtained. A receive time interval $GAP_R$ of the measurement period M may be obtained through performing arithmetic averaging on the $H*(H-1)/2$ sample points. Compared to a prior-art manner of collecting a sample point from only two consecutively sent measurement data packets, this sampling manner can greatly improve accuracy of receive time interval measurement.

The transient congestion caused by the detection sequence may result in $GAP_R > GAP$, and therefore $Delta(M) = (GAP_R - GAP)/GAP$. A set (Delta(M), u(M)) of data may be obtained through measurement of a plurality of periods. Through linear fitting of Delta(M) and u(M), Delta(M) = K1*u(M)+K2. An obtained value of the bottleneck bandwidth is 1/K1 and an obtained value of the available bandwidth is −K2/K1.

It should be noted that a data processing process related to the foregoing detection steps may be implemented in a transmission bandwidth detection unit.

The transmission bandwidth detection technology is a gradual self-learning correction mechanism based on historical information. Therefore, when detection is just started or when a detected fault is self-rectified, this self-learning correction process consumes a large amount of time because there is no historical information. To accelerate detection of the detection unit and implement fast locking and tracking until an accurate transmission bandwidth is obtained, an embodiment of the present invention further provides a self-starting self-recovery solution. The solution may be used with reference to any foregoing examples, and a triggering condition may be detection startup, detected-fault rectification, or particular triggering, where the particular triggering may be a particular triggering under manual control.

Figure 5:
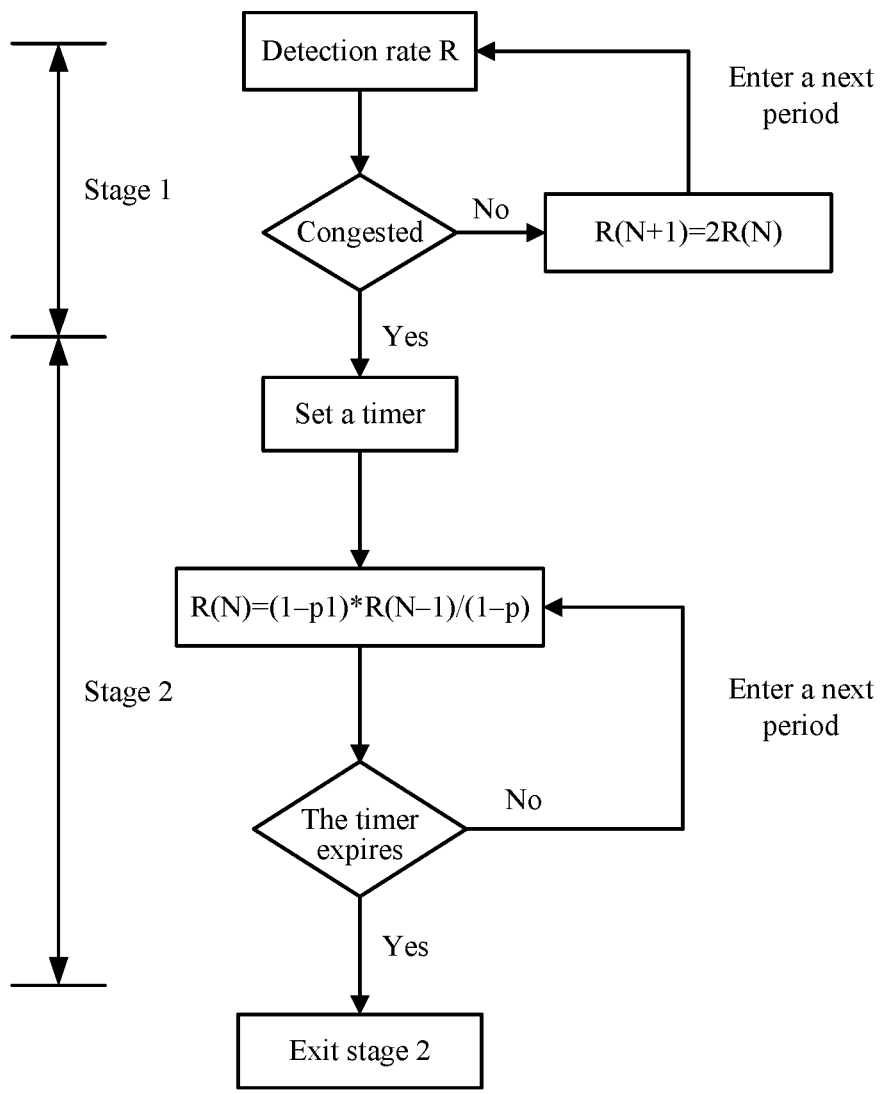
FIG. 5 is a schematic diagram of a possible relationship between various units according to an embodiment of the present invention.

According to this solution, transmission congestion is created on a transmission link, and the congestion is maintained for a period of time, so as to quickly learn a transmission bandwidth parameter at a transmission bandwidth assurance level corresponding to a transmission bandwidth detection unit. The transmission bandwidth parameter is used by the transmission bandwidth detection unit during measurement to quickly lock a transmission bandwidth at a transmission bandwidth assurance level to be measured by the transmission bandwidth detection unit, so as to obtain a detection result. For details, refer to a self-starting self-recovery flowchart in FIG. 5. As shown in FIG. 5, a self-starting self-learning process may be divided into two stages. Stage 1 is used to create transmission congestion. At stage 1, congestion is created by gradually increasing a detection rate. In an implementation, when a congestion effect cannot be achieved at a detection rate R(N) of a current period, a detection rate 2R(N) may be used as a transmit detection rate in a next period until congestion occurs, to enter stage 2. Stage 2 is used to learn, in a quick detection manner in a continuously congested state, a transmission bandwidth parameter that needs to be obtained by the detection unit. At stage 2, congestion duration may be limited by setting a timer. When the timer expires, stage 2 exits. In this process, a congestion degree in each measurement period needs to be controlled, so as to avoid excessive congestion that affects implementation of other services in the entire transmission network, or insufficient congestion that causes a failure in obtaining an accurate transmission bandwidth parameter. In an implementation, the detection rate R(N) of the current period and a detection rate R(N−1) of a previous period can satisfy the following equation: R(N)=(1−p1)*R(N−1)/(1−p), where p1 is a measurement data packet loss rate of the current period, and p is a target data packet loss rate. Then, (1−p1) may be referred to as a measurement data packet pass rate of the current period, (1−p) may be referred to as a target data packet pass rate. To be specific, a ratio of the detection rate R(N) of the current period to the detection rate R(N−1) of the previous period is equal to a ratio of the data packet pass rate of the current period to the target data packet pass rate. When stage 2 exits, a relatively accurate transmission bandwidth parameter may be obtained. The transmission bandwidth parameter may be a bottleneck bandwidth parameter or an available bandwidth parameter at the transmission bandwidth assurance level corresponding to the detection unit.

The foregoing self-starting self-recovery solution may be implemented by a self-starting self-recovery unit.

The technical solution of this embodiment of the present invention may further provide an automatic identification and adaptation capability. For example, when the transmission link is switched from using a multi-level bandwidth assurance technology to using single-level bandwidth assurance, a quantity of transmission bandwidth detection units can be automatically identified and reduced to only one transmission bandwidth detection unit. For another example, when a configured transmission bandwidth detection unit is faulty, a new transmission bandwidth detection unit may be automatically generated to replace the faulty transmission bandwidth detection unit in a timely manner. These functions greatly improve overall flexibility of transmission bandwidth detection and are particularly applicable to a complicated and changeable transmission network scenario.

In addition, the transmission bandwidth detection unit, the control unit, the combination unit, and the self-starting self-recovery unit that are described in the embodiments of the present invention may be located in a same transmission device, such as a source device or a destination device; or deployed dispersedly in a transmission network to which the transmission link belongs, for example, some units are located in a source device and other units are located in a destination device. For another example, various units are located in another site different from the source device and the destination device in the transmission network. This is not limited in the present invention. When these units are located in a same transmission device, detection efficiency is higher and implementation is easy; when these units are deployed dispersedly in the transmission network, flexibility is higher and implementation is not limited by a site.

FIG. 5 is a schematic diagram of a possible relationship between various units described above.

In the technical solutions of the embodiments of the present invention, the at least two transmission bandwidth detection units are used to detect the transmission bandwidth of the transmission link. In particular, in a multi-level transmission bandwidth assurance mechanism, a transmission bandwidth detection unit corresponding to each level is used to detect the transmission bandwidth of the transmission link. This greatly reduces detection duration, improves real-time performance of detection and accuracy of each detection, and is applicable to a typical scenario such as a transmission network bandwidth fluctuation scenario.

The foregoing mainly describes the solutions provided in the embodiments of the present invention from a perspective of a method procedure. It can be understood that, to implement the foregoing method, a corresponding hardware structure and/or software module for performing each function exists. A person of ordinary skill in the art should easily be aware that, units and algorithm steps in examples described with reference to the embodiments disclosed in this specification can be implemented by hardware or a combination of hardware and computer software in the embodiments of the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 6:
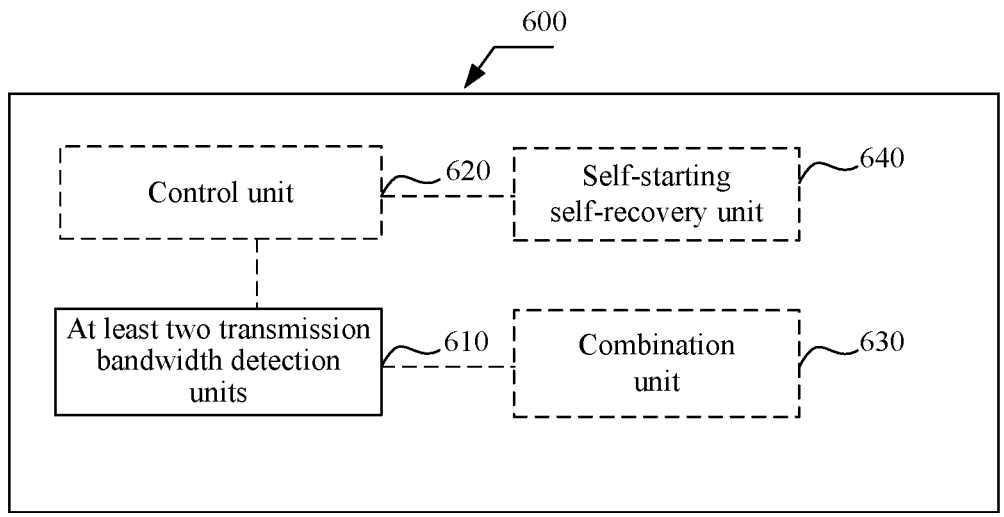
FIG. 6 is a schematic diagram of a detection system according to an embodiment of the present invention.

FIG. 6 shows a detection system 600 according to an embodiment of the present invention. The detection system 600 may include at least two transmission bandwidth detection units. The at least two transmission bandwidth detection units are collectively marked as 610 and are configured to detect a transmission bandwidth of a transmission link.

Each transmission bandwidth assurance level in multi-level transmission bandwidth assurance is corresponding to only one of the at least two transmission bandwidth detection units, and when the transmission link operates at a first transmission bandwidth assurance level, a first transmission bandwidth detection unit corresponding to the first transmission bandwidth assurance level detects the transmission bandwidth of the transmission link.

The first transmission bandwidth assurance level is a transmission bandwidth assurance level in the multi-level transmission bandwidth assurance, and the first transmission bandwidth detection unit belongs to the at least two transmission bandwidth detection units.

Optionally, the detection system 600 may further include a control unit 620, configured to, when the transmission link operates at the first transmission bandwidth assurance level, trigger the first transmission bandwidth detection unit corresponding to the first transmission bandwidth assurance level to detect the transmission bandwidth of the transmission link.

Optionally, the detection system 600 may further include a combination unit 630, configured to add detection results of the at least two transmission bandwidth detection units in time domain, to obtain a time-domain combined transmission bandwidth.

Optionally, the detection system 600 may further include a self-starting self-recovering unit 640, configured to: in a case of detection startup, detected-fault rectification, or particular triggering, create congestion to obtain a transmission bandwidth parameter of at least one transmission bandwidth assurance level in the multi-level transmission bandwidth assurance, where the transmission bandwidth parameter is used by a transmission bandwidth detection unit corresponding to the at least one transmission bandwidth assurance level to perform in-detection transmission bandwidth tracking on the transmission bandwidth of the transmission link.

Duration of the congestion includes a plurality of measurement periods, and a ratio of a congestion detection rate of a current measurement period to a congestion detection rate of a previous measurement period is a ratio of a measurement data packet pass rate of a current period to a target data packet pass rate of the current period.

Certainly, as described above, these units may be alternatively deployed dispersedly in an entire transmission network, or located in a same transmission device. When these units are located in a same transmission device, the units of the detection system 600 are located in the transmission device.

Figure 7:
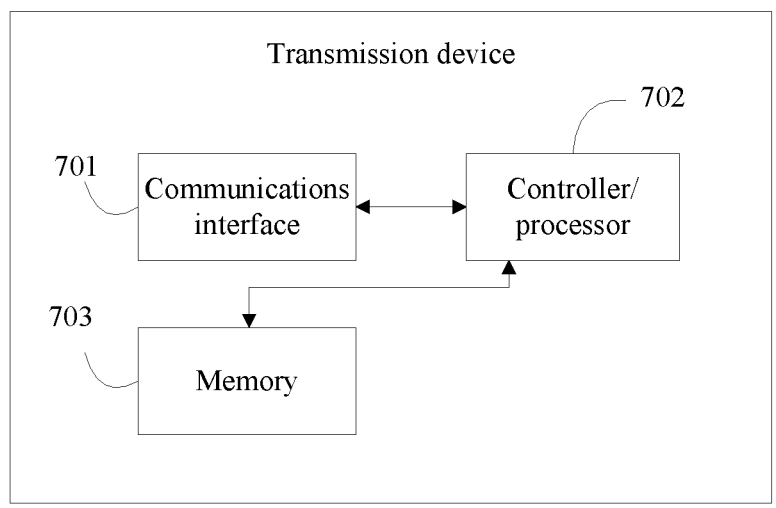
FIG. 7 is a schematic diagram of a transmission device according to an embodiment of the present invention.

The units in the embodiment of the present invention shown in FIG. 3 may be located in a same transmission device. FIG. 7 is a schematic diagram of a possible structure of the transmission device.

The transmission device includes a communications interface 701, a controller/processor 702, and a memory 703. The communications interface 701 as configured to support the transmission device in data transmission. The controller/processor 702 performs various functions for communicating with another transmission device. The controller/processor 702 further executes a processing process related to the transmission device in FIG. 3 and/or another process used in the technology described in this application. The memory 703 is configured to store program code and data of the transmission device.

It can be understood that FIG. 7 shows only a simplified design of the transmission device. In actual application, the transmission device may include any quantity of communications interfaces, processors, controllers, and memories, and all transmission devices that may implement the present invention fall within the protection scope of the present invention.

A person skilled in the art may further understand that various illustrative logical blocks and steps that are listed in the embodiments of the present invention may be implemented by using electronic hardware, computer software, or a combination thereof. In order to clearly display the interchangeability between the hardware and the software, functions of the foregoing various illustrative components and steps have been generally described. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of the present invention.

The various illustrative logical blocks, modules, and circuits described in the embodiments of the present invention may implement or operate the described functions by using a general-purpose processing unit, a digital signal processing unit, an application-specific integrated circuit (ASIC), a field programmable gate array (FPGA) or another programmable logical apparatus, a discrete gate or transistor logic, a discrete hardware component, or a design of any combination thereof. The general-purpose processing unit may be a microprocessing unit. Optionally, the general-purpose processing unit may be any traditional processing unit, controller, microcontroller, or state machine. The processing unit may be implemented by a combination of computing apparatuses, such as a digital signal processing unit and a microprocessing unit, a plurality of microprocessing units, one or more microprocessing units with a digital signal processing unit core, or any other similar configuration.

Steps of the methods or algorithms described in the embodiments of the present invention may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processing unit so that the processing unit may read information from the storage medium and write information into the storage medium. Optionally, the storage medium may be further integrated into a processing unit. The processing unit and the storage medium may be configured in an ASIC, and the ASIC may be configured in a user terminal. Optionally, the processing unit and the storage medium may also be configured in different components of the user terminal.

In one or more examples of designs, the foregoing functions described in the embodiments of the present invention may be implemented by using hardware, software, firmware, or any combination thereof. If the functions are implemented by using software, these functions may be stored in a computer readable medium or are transmitted to the computer readable medium in a form of one or more instructions or code. The computer readable medium includes a computer storage medium and a communications medium that facilitates transmission of a computer program from one place to another. The storage medium may be an available medium that may be accessed by any general or special computer. For example, such a computer readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processing unit. In addition, any connection may be appropriately defined as a computer readable medium. For example, if software is transmitted from a website, a server, or another remote resource by using a coaxial cable, an optical fiber, a twisted pair, a digital subscriber line (DSL) or in a wireless manner, such as infrared, radio, or microwave, the software is included in a defined computer readable medium. The disc and the disk include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer readable medium.

According to the foregoing description of this specification in the present invention, a person skilled in the art may use or implement the content of the present invention. Any modification based on the disclosed content shall be considered obvious in the art. The basic principles described in the present invention may be applied to other variations without departing from the essence and scope of the present invention. Therefore, the content disclosed in the present invention is not limited to the described embodiments and designs but may also be extended to a maximum scope that is consistent with the principles and disclosed new features of the present invention.

What is claimed is:

1. A detection method, applied to transmission bandwidth detection for multi-level transmission bandwidth assurance, wherein the method comprises:
   detecting, by at least two transmission bandwidth detection units, a transmission bandwidth of a transmission link; wherein each transmission bandwidth assurance level in the multi-level transmission bandwidth assurance corresponds to only one of the at least two transmission bandwidth detection units, and when the transmission link operates at a first transmission bandwidth assurance level, a first transmission bandwidth detection unit corresponding to the first transmission bandwidth assurance level detects the transmission bandwidth of the transmission link; and the first transmission bandwidth assurance level is a transmission bandwidth assurance level in the multi-level transmission bandwidth assurance, and the first transmission bandwidth detection unit belongs to the at least two transmission bandwidth detection units, wherein the detection comprises a plurality of measurement periods, and wherein the detecting, by at least two transmission bandwidth detection units, a transmission bandwidth of a transmission link comprises:

calculating, by the at least two transmission bandwidth detection units, the transmission bandwidth of the transmission link by using $H*(H-1)/2$ sample points obtained in each measurement period, wherein the $H*(H-1)/2$ sample points obtained in each measurement period is obtained through sampling after H measurement data packets sent in each measurement period are combined in a unit of any two measurement data packets, and H is a positive integer greater than or equal to 3.

2. The method according to claim 1, wherein an operating time of the transmission link is divided based on a transmission bandwidth assurance level, and transmission bandwidth detection units that detect the transmission bandwidth of the transmission link in two neighboring operating time subsegments are different.

3. The method according to claim 1, wherein the method further comprises:

triggering, by a control unit when the transmission link operates at the first transmission bandwidth assurance level, the first transmission bandwidth detection unit corresponding to the first transmission bandwidth assurance level to detect the transmission bandwidth of the transmission link.

4. The method according to claim 3, wherein the method further comprises:

determining, by the control unit based on at least one of a transmission bandwidth status in a current time segment and a transmission congested state in the current time segment, that the transmission link is at the first transmission bandwidth assurance level in the current time segment; and the triggering, by a control unit when the transmission link operates at the first transmission bandwidth assurance level, the first transmission bandwidth detection unit corresponding to the first transmission bandwidth assurance level to detect the transmission bandwidth of the transmission link comprises:

determining, by the control unit based on the determined first transmission bandwidth assurance level, a transmission bandwidth detection unit corresponding to the first transmission bandwidth assurance level as the first transmission bandwidth detection unit; and triggering, by the control unit, the first transmission bandwidth detection unit to operate in the current time segment.

5. The method according to claim 4, wherein a detection result of the first transmission bandwidth detection unit corresponding to the first transmission bandwidth assurance level in the current time segment is a transmission bandwidth status in a next time segment.

6. The method according to claim 1, wherein the method further comprises:

adding, by a combination unit, detection results of the at least two transmission bandwidth detection units in time domain, to obtain a time-domain combined transmission bandwidth.

7. The method according to claim 1, wherein the method further comprises:

in a case of detection startup, detected-fault rectification, or particular triggering, creating, by a self-starting self-recovery unit, congestion to obtain a transmission bandwidth parameter of at least one transmission bandwidth assurance level in the multi-level transmission bandwidth assurance, wherein the transmission bandwidth parameter is used by a transmission bandwidth detection unit corresponding to the at least one transmission bandwidth assurance level to perform in-detection transmission bandwidth tracking on the transmission bandwidth of the transmission link; wherein duration of the congestion comprises a plurality of measurement periods, and a ratio of a congestion detection rate of a current measurement period to a congestion detection rate of a previous measurement period is a ratio of a measurement data packet pass rate of a current period to a target data packet pass rate of the current period.

8. The method according to claim 7, wherein the transmission bandwidth detection unit, the control unit, the combination unit, and the self-starting self-recovery unit are located in a same transmission device, or deployed dispersedly in a transmission network to which the transmission link belongs.

9. A detection system, applied to transmission bandwidth detection for multi-level transmission bandwidth assurance, wherein the system comprises:

at least two transmission bandwidth detection units, configured to detect a transmission bandwidth of a transmission link; wherein each transmission bandwidth assurance level in the multi-level transmission bandwidth assurance corresponds to only one of the at least two transmission bandwidth detection units, and when the transmission link operates at a first transmission bandwidth assurance level, a first transmission bandwidth detection unit corresponding to the first transmission bandwidth assurance level detects the transmission bandwidth of the transmission link; and the first transmission bandwidth assurance level is a transmission bandwidth assurance level in the multi-level transmission bandwidth assurance, and the first transmission bandwidth detection unit belongs to the at least two transmission bandwidth detection units, wherein the detection comprises a plurality of measurement periods, and at least two transmission bandwidth detection units are configured to detect a transmission bandwidth of a transmission link comprises: calculating the transmission bandwidth of the transmission link by using $H*(H-1)/2$ sample points obtained in each measurement period, and wherein the $H*(H-1)/2$ sample points obtained in each measurement period is obtained through sampling after H measurement data packets sent in each measurement period are combined in a unit of any two measurement data packets; and H is a positive integer greater than or equal to 3.

10. The system according to claim 9, wherein an operating time of the transmission link is divided based on a transmission bandwidth assurance level, and transmission bandwidth detection units that detect the transmission bandwidth of the transmission link in two neighboring operating time subsegments are different.

11. The system according to claim 9, wherein the system further comprises:
   a control unit, configured to, when the transmission link operates at the first transmission bandwidth assurance level, trigger the first transmission bandwidth detection unit corresponding to the first transmission bandwidth assurance level to detect the transmission bandwidth of the transmission link.

12. The system according to claim 11, wherein
   the control unit is further configured to determine, based on at least one of a transmission bandwidth status in a current time segment and a transmission congested state in the current time segment, that the transmission link is at the first transmission bandwidth assurance level in the current time segment; and
   that the control unit is configured to, when the transmission link operates at the first transmission bandwidth assurance level, trigger the first transmission bandwidth detection unit corresponding to the first transmission bandwidth assurance level to detect the transmission bandwidth of the transmission link comprises:
   determining, based on the determined first transmission bandwidth assurance level, a transmission bandwidth detection unit corresponding to the first transmission bandwidth assurance level as the first transmission bandwidth detection unit; and triggering the first transmission bandwidth detection unit operate in the current time segment.

13. The system according to claim 12, wherein a detection result of the first transmission bandwidth detection unit corresponding to the first transmission bandwidth assurance level in the current time segment is a transmission bandwidth status in a next time segment.

14. The system according to claim 9, wherein the system further comprises:
   a combination unit, configured to add detection results of the at least two transmission bandwidth detection units in time domain, to obtain a time-domain combined transmission bandwidth.

15. The system according to claim 9, wherein the system further comprises:
   a self-starting self-recovery unit, configured to: in a case of detection startup, detected-fault rectification, or particular triggering, create congestion to obtain a transmission bandwidth parameter of at least one transmission bandwidth assurance level in the multi-level transmission bandwidth assurance, wherein the transmission bandwidth parameter is used by a transmission bandwidth detection unit corresponding to the at least one transmission bandwidth assurance level to perform in-detection transmission bandwidth tracking on the transmission bandwidth of the transmission link; wherein
   duration of the congestion comprises a plurality of measurement periods, and a ratio of a congestion detection rate of a current measurement period to a congestion detection rate of a previous measurement period is a ratio of measurement data packet pass rate of a current period to a target data packet pass rate of the current period.

16. The system according to claim 9, wherein the system is located in a same transmission device.

* * * * *

UNITED STATES PATENT AND TRADEMARK OFFICE
CERTIFICATE OF CORRECTION

| | | |
|---|---|---|
| PATENT NO. | : 11,133,995 B2 | Page 1 of 1 |
| APPLICATION NO. | : 16/387981 | |
| DATED | : September 28, 2021 | |
| INVENTOR(S) | : Lan et al. | |

It is certified that error appears in the above-identified patent and that said Letters Patent is hereby corrected as shown below:

On the Title Page

Applicant (71): "HUAWEI TECHNOLOGIES CO., LTD., Guangdong (CN)" should read
-- HUAWEI TECHNOLOGIES CO., LTD., Shenzhen (CN) --.

Signed and Sealed this
Nineteenth Day of July, 2022

Katherine Kelly Vidal
*Director of the United States Patent and Trademark Office*